Nov. 30, 1954  R. J. McGONEGLE  2,695,772

DIFFERENTIAL CONDITION CONTROLLER

Filed Aug. 16, 1951

INVENTOR
Richmond J. McGonegle

BY  *Jos. R. Scalzo*

ATTORNEY 2,695,772
Patented Nov. 30, 1954

2,695,772

DIFFERENTIAL CONDITION CONTROLLER

Richmond J. McGonegle, Toledo, Ohio

Application August 16, 1951, Serial No. 242,158

2 Claims. (Cl. 257—3)

The present invention relates to a condition control device used to control the condition of one location at a predetermined condition differential from that of another location. This invention is particularly useful in, but not limited to, temperature control work where it often is desirable to maintain a condition where the temperature of one volume of air is constantly held above or below that of another as for instance, maintaining the temperature of an enclosed volume containing delicate electrical equipment at 5 to 10 degrees above the temperature of the atmosphere outside the enclosure to prevent harmful condensation of moisture within the enclosure.

Heretofore whenever it was required to maintain the temperature of one location above that of another, the general method for accomplishing this was to supply excessive heat to insure a sufficiently high temperature. This wasting of heat of course was uneconomical. In the present invention we have a relatively simple device that operates to maintain the temperature of one location at a substantially predetermined differential above another location and hence not only insures a sufficient temperature but also eliminates the wasting of heat by automatically cutting out the heat supply when the predetermined temperature differential is exceeded. In general the device of this invention consists of co-extending shafts that respond to temperature changes and in turn operate electric contacts to make and break electric circuits which in turn control a source of heat or cooling.

Figure 1:
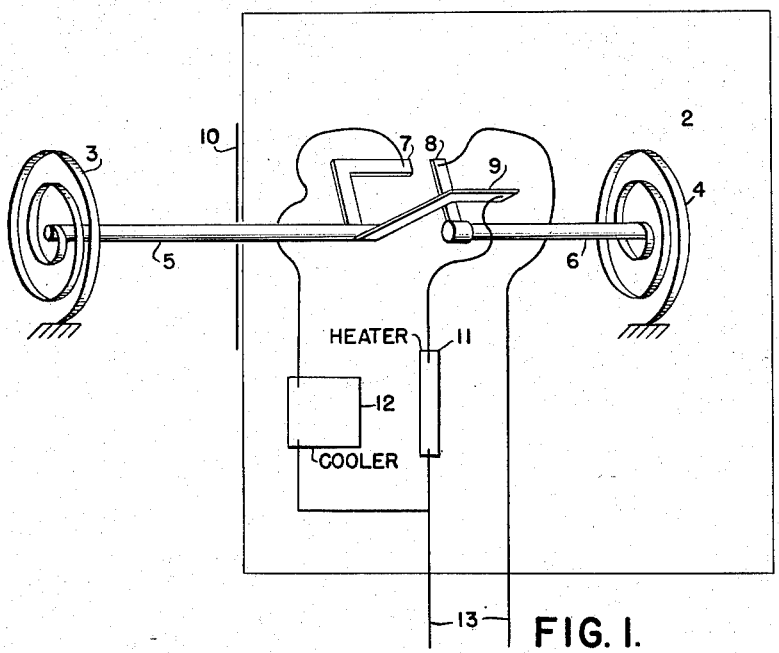
Figure 2:
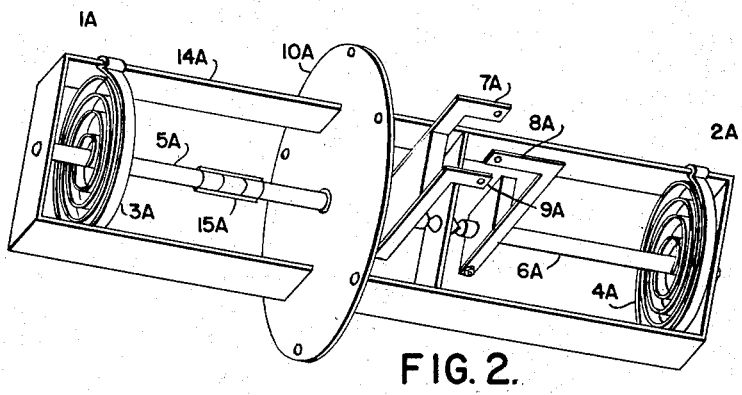

One object of this invention of course is to maintain the temperature of one location at a predetermined differential above or below that of another location. Another object of this invention is to eliminate the wasting of supplied heat by maintaining the temperature difference between two locations within narrow limits. Still another object of this invention is to provide a temperature control device that not only is efficient in operation but one that is easy to construct, relatively cheap to purchase and simple to install and operate. Other objects will become manifest as further disclosure is made. Referring now to the accompanying drawings:

Figure 1 is a diagrammatic view of a temperature control device and its electric circuits which in this case control both a heating and a cooling system, Figure 2 is a perspective view of a bimetallic coil temperature controller.

Referring now to Figure 1, numeral 1 is an atmosphere of variable temperature, and 2 is a second atmosphere which is controlled by the device of this invention. Numerals 3 and 4 in this instance are bimetal coils that respond in the same direction to a temperature change. Shaft 5 rotates counter clockwise (facing coil 3) when the temperature of atmosphere 1 rises. Shaft 6 rotates counter clockwise (facing coil 3) when the temperature of atmosphere 2 rises. Numeral 10 is a heat transfer barrier to keep the temperature of atmosphere 2 surrounding coil 4 from adversely effecting coil 3 and likewise atmosphere 1 from effecting coil 4. The barrier may include low heat conduction material in shaft 5, or a section of shaft 5 made of glass or fiber, and the frame designed of material of such cross section to limit the conduction of heat to coil 3, from atmosphere 2. Shaft 6 carries an electric contact 8, and shaft 5 carries contacts 7 and 9. Electrical energy is supplied to the control system through wires 13 from an outside source not shown.

When the temperature of atmosphere 1 rises a pre-set amount without a change in atmosphere 2, contact 9 rotates toward contact 8 until an electric circuit is completed from the outside electric source 13 to a heating device 11, such as an electric heating element, which causes the temperature of atmosphere 2 to rise. Assuming no change in the temperature of atmosphere 1, atmosphere 2 will continue to rise in temperature causing contact 8 to rotate in a direction away from 9 thus break the electric circuit to heat source 11 stopping the heat flow to 2. By proper positioning of contacts 8 and 9 on shafts 5 and 6, atmosphere 2 can be kept at a substantially fixed amount above atmosphere 1 providing there is no other source of heat than source 11, to atmosphere 2. In the event of other sources of heat to atmosphere 2, and it is desired to hold the temperature of 2 a fixed amount above 1, contact 7 is provided. Assuming the temperature of 2 to continue to rise above atmosphere 1, contact 8 will rotate towards contact 7, completing an electric circuit to cooler 12 which can be a fan or the like. Cooler 12 will then lower the temperature of 2 until contact 8 rotates away from 7 thus stopping the cooling action. A rise in the temperature of atmosphere 1 also can stop the cooling action by opening contacts 7 and 8. If bimetal coils 3 and 4 have exactly the same response to a temperature change, the temperature of atmosphere 2 can be maintained a fixed and predetermined amount above or below that of the temperature of atmosphere 1, regardless of how 1 may vary within the limits set by the spacing between contacts 7 and 9. For instance it has been determined that the contact relations might be adjusted to keep temperature of atmosphere 2 at 10 degrees above temperature 1, in a range of plus or minus 1 degree. Assuming temperature 1 at 0 degrees then, temperature 2 would always be between 9 and 11 degrees, and if temperature 1 should raise to 100 degrees, temperature 2 would then remain between 109 and 111 degrees.

If it should be desired to hold the temperature of atmosphere 2 at say fifteen degrees above atmosphere 1 when 1 is at 100 degrees, and only 5 degrees above 1 when 1 is at 0 degrees, this change in differential can be accomplished by adding more length to the bimetal coil 3, increasing its response to temperature rise. A change in differential in the other direction would be accomplished by decreasing the response of 3 in relation to 4, and by so doing change the operating temperature differential at different temperature levels to almost any desired range.

In the preferred embodiment contacts 7, 8 and 9 are made suitable for making and breaking electrical circuits thru compounding by the usual means of magnetic or spring force to give fast contact on breaking action. As can be seen from Figures 1 and 2 when the contacts 8 and 9 rotate to make contact with each other the electrical circuit activating heating element 11 will be in operation and heat will be supplied until the circuit is broken. Likewise, when contacts 7 and 8 are in contact with each other the electrical circuit activating the cooling means 12, will be put in operation and heat will be carried away as the temperature of the enclosure, in this case atmosphere 2, is lowered.

Figure 2 is a perspective view of one form of bimetal coil temperature controller in which all part numerals are identical with the parts of Figure 1, and the operating description for Figure 1 applies in all respects to Figure 2 except that the electrical wiring is omitted. A supporting frame 14a for the coils and bearings for shafts 5a and 6a are shown. The shaft 5a is made with a section 15a of low heat conducting material to act as another barrier to heat transfer to coil 3a from atmosphere 2a.

What has been shown and described in the preceding discussion are simple, practical and operatable devices for accomplishing the purposes of this invention. It is manifest that certain alterations can be made and still remain within the scope of the present invention for which the following is claimed.

I claim:

1. For use in two separated atmospheres, one of which is thermally controlled and the other is uncontrolled, a temperature control device of the class described which includes, co-extending shafts; bimetallic shaft rotating means mounted on each of said shafts and each of said bimetallic rotating means being immediately surrounded by one of the separated atmospheres when in service, and both of said bimetallic rotating means being mounted so that both of said shafts will rotate in the same direction when both atmospheres surrounding said shaft moving means vary in the same direction, so that the temperature of the controlled atmosphere will always vary directly with the uncontrolled atmosphere; a heat barrier constructed as an integral part of said control device and positioned between said two shaft rotating means so as to interrupt the flow of heat between the separated rotating means; an electric circuit; contact means carried by said shafts adapted to make and break said electric circuit, adjustable means for changing the contact position on one of said shafts in relation to the contact means on said other shaft in order to adjust and obtain any desired temperature differential; a heating means controlled by said electric circuit for adding heat to the controlled separated atmosphere surrounding one of said bimetallic shaft rotating means, and said shaft rotating means being adapted to always operate said contacts and said electric circuit so that the temperature of the controlled atmosphere surrounding one of said shaft rotating means will always remain a predetermined and fixed differential above the temperature of the uncontrolled atmosphere surrounding said other shaft rotating means.

2. The same as claim 1 with the addition of a cooling means controlled by said electric circuit for taking away heat to the controlled atmosphere surrounding one of said bimetallic shaft moving means.

References Cited in the file of this patent

UNITED STATES PATENTS

| Number | Name | Date |
|---|---|---|
| 1,988,495 | Hulse | Jan. 22, 1935 |
| 2,460,748 | Hersey | Feb. 1, 1949 |

FOREIGN PATENTS

| Number | Country | Date |
|---|---|---|
| 318,699 | Great Britain | Sept. 12, 1929 |
| 832,151 | France | June 17, 1938 |